United States Patent
Herz

(10) Patent No.: US 6,956,496 B1
(45) Date of Patent: Oct. 18, 2005

(54) METHOD AND APPARATUS FOR UPDATING UNIVERSAL REMOTE DATABASES THROUGH TV VBI PROCESSING

(75) Inventor: William Herz, Hayward, CA (US)

(73) Assignee: ZiLOG, Inc., San Jose, CA (US)

(*) Notice: Subject to any disclaimer, the term of this patent is extended or adjusted under 35 U.S.C. 154(b) by 0 days.

(21) Appl. No.: 09/484,088

(22) Filed: Jan. 18, 2000

(51) Int. Cl.⁷ .............................................. H04Q 1/00
(52) U.S. Cl. ......................... 340/825.22; 340/825.69; 348/734; 398/107
(58) Field of Search ............... 340/825.22, 825.69, 340/825.72; 398/107; 348/734; 379/88.13

(56) References Cited

U.S. PATENT DOCUMENTS

| | | |
|---|---|---|
| 4,712,105 A | 12/1987 | Köhler |
| 4,746,919 A | 5/1988 | Reitmeier |
| 4,856,081 A | 8/1989 | Smith |
| 4,866,522 A | 9/1989 | Beckley |
| 4,872,151 A | 10/1989 | Smith |
| 4,872,195 A | 10/1989 | Leonard |
| 4,894,789 A | 1/1990 | Yee |
| 4,959,810 A | 9/1990 | Darbee et al. |
| 5,031,046 A | 7/1991 | Bruggemann |
| 5,075,771 A | 12/1991 | Hashimoto |
| 5,086,385 A | 2/1992 | Launey et al. |
| 5,093,718 A | 3/1992 | Hoarty et al. |
| 5,138,649 A | 8/1992 | Krisbergh |
| 5,199,080 A | 3/1993 | Kimura et al. |
| 5,223,924 A | 6/1993 | Strubbe |
| 5,228,077 A | 7/1993 | Darbee |
| 5,251,034 A | 10/1993 | Na |
| 5,262,860 A | 11/1993 | Fitzpatrick et al. |
| 5,267,323 A | 11/1993 | Kimura |
| 5,282,028 A | 1/1994 | Johnson et al. |
| 5,287,224 A | 2/1994 | Tsuchiya et al. |
| 5,307,055 A | 4/1994 | Baskin et al. |
| 5,315,391 A | 5/1994 | Lee |
| 5,343,239 A | 8/1994 | Lappington et al. |
| 5,371,901 A | 12/1994 | Reed et al. |
| 5,379,421 A | 1/1995 | Palazzi, III et al. |
| 5,396,546 A | 3/1995 | Remillard |
| 5,410,326 A * | 4/1995 | Goldstein .............. 340/825.72 |
| 5,422,677 A | 6/1995 | Do |
| 5,455,560 A | 10/1995 | Owen |
| 5,455,570 A | 10/1995 | Cook et al. |
| 5,465,385 A | 11/1995 | Ohga et al. |
| 5,481,542 A | 1/1996 | Logston et al. |

(Continued)

FOREIGN PATENT DOCUMENTS

JP          55-140371          11/1980

(Continued)

OTHER PUBLICATIONS

English translation of Reference B1 which was cited by the Examiner on Form PTO-892, Japanese Open Patent Bulletin entitled "Television Receiving System" Nov. 1980.

*Primary Examiner*—Brian Zimmerman
(74) *Attorney, Agent, or Firm*—Parsons Hsue & de Runtz LLP

(57) ABSTRACT

Universal remote control device database is updated through television video blanking interval (TV VBI) or sub-picture signal processing. As relayed through TV receiver, remote control database(s) is placed in VBI or sub-picture of video signal of specialized program. Data is decoded by VBI slicer or controller (e.g., MPEG decoder), then extracted and stored temporarily in memory. Upon request, data is transmitted via infra-red (IR) or radio-frequency (RF) emitter to learning remote control device, which downloads data to update remote programming protocol.

3 Claims, 3 Drawing Sheets

U.S. PATENT DOCUMENTS

| | | |
|---|---|---|
| 5,497,186 A | 3/1996 | Kawasaki |
| 5,499,046 A | 3/1996 | Schiller et al. |
| 5,500,691 A | 3/1996 | Martin et al. |
| 5,500,794 A | 3/1996 | Fujita et al. |
| 5,506,717 A | 4/1996 | Kho |
| 5,515,347 A | 5/1996 | Mulder et al. |
| 5,523,794 A | 6/1996 | Mankovitz et al. |
| 5,543,857 A | 8/1996 | Wehmeyer et al. |
| 5,545,857 A | 8/1996 | Lee et al. |
| 5,557,338 A | 9/1996 | Maze et al. |
| 5,561,708 A | 10/1996 | Remillard |
| 5,574,964 A | 11/1996 | Hamlin |
| 5,585,866 A | 12/1996 | Miller et al. |
| 5,589,892 A | 12/1996 | Knee et al. |
| 5,594,509 A | 1/1997 | Florin et al. |
| 5,598,143 A | 1/1997 | Wentz |
| 5,600,368 A | 2/1997 | Matthews, III |
| 5,608,446 A | 3/1997 | Carr et al. |
| 5,619,274 A | 4/1997 | Roop et al. |
| 5,621,456 A | 4/1997 | Florin et al. |
| 5,629,868 A * | 5/1997 | Tessier et al. .............. 348/164 |
| 5,630,757 A | 5/1997 | Gagin et al. |
| 5,646,608 A | 7/1997 | Shintani |
| 5,648,824 A | 7/1997 | Dunn et al. |
| 5,657,072 A | 8/1997 | Aristides et al. |
| 5,671,267 A | 9/1997 | August et al. |
| 5,689,663 A | 11/1997 | Williams |
| 5,694,163 A | 12/1997 | Harrison |
| 5,699,124 A | 12/1997 | Nuber et al. |
| 5,708,961 A | 1/1998 | Hylton et al. |
| 5,715,020 A | 2/1998 | Kuroiwa et al. |
| 5,722,041 A | 2/1998 | Freadman |
| 5,761,606 A | 6/1998 | Wolzien |
| 5,781,228 A | 7/1998 | Sposato |
| 5,802,467 A | 9/1998 | Salazar et al. |
| 5,828,403 A | 10/1998 | DeRodeff et al. |
| 5,898,398 A | 4/1999 | Kumai |
| 5,898,919 A | 4/1999 | Yuen |
| 5,903,259 A | 5/1999 | Brusky et al. |
| 5,952,936 A | 9/1999 | Enomoto |
| 5,956,025 A | 9/1999 | Goulden et al. |
| 6,002,450 A | 12/1999 | Darbee et al. |
| 6,040,829 A | 3/2000 | Croy et al. |
| 6,052,155 A | 4/2000 | Cherrick et al. |
| 6,097,441 A * | 8/2000 | Allport ...................... 348/734 |
| 6,104,334 A | 8/2000 | Allport |
| 6,130,726 A | 10/2000 | Darbee et al. |
| 6,211,856 B1 | 4/2001 | Choi et al. |
| 6,407,779 B1 * | 6/2002 | Herz .................... 340/825.69 |
| 6,510,209 B1 * | 1/2003 | Cannon et al. .......... 379/88.13 |

FOREIGN PATENT DOCUMENTS

| | | |
|---|---|---|
| JP | 05037873 | 2/1993 |
| WO | 9843158 | 10/1998 |

* cited by examiner

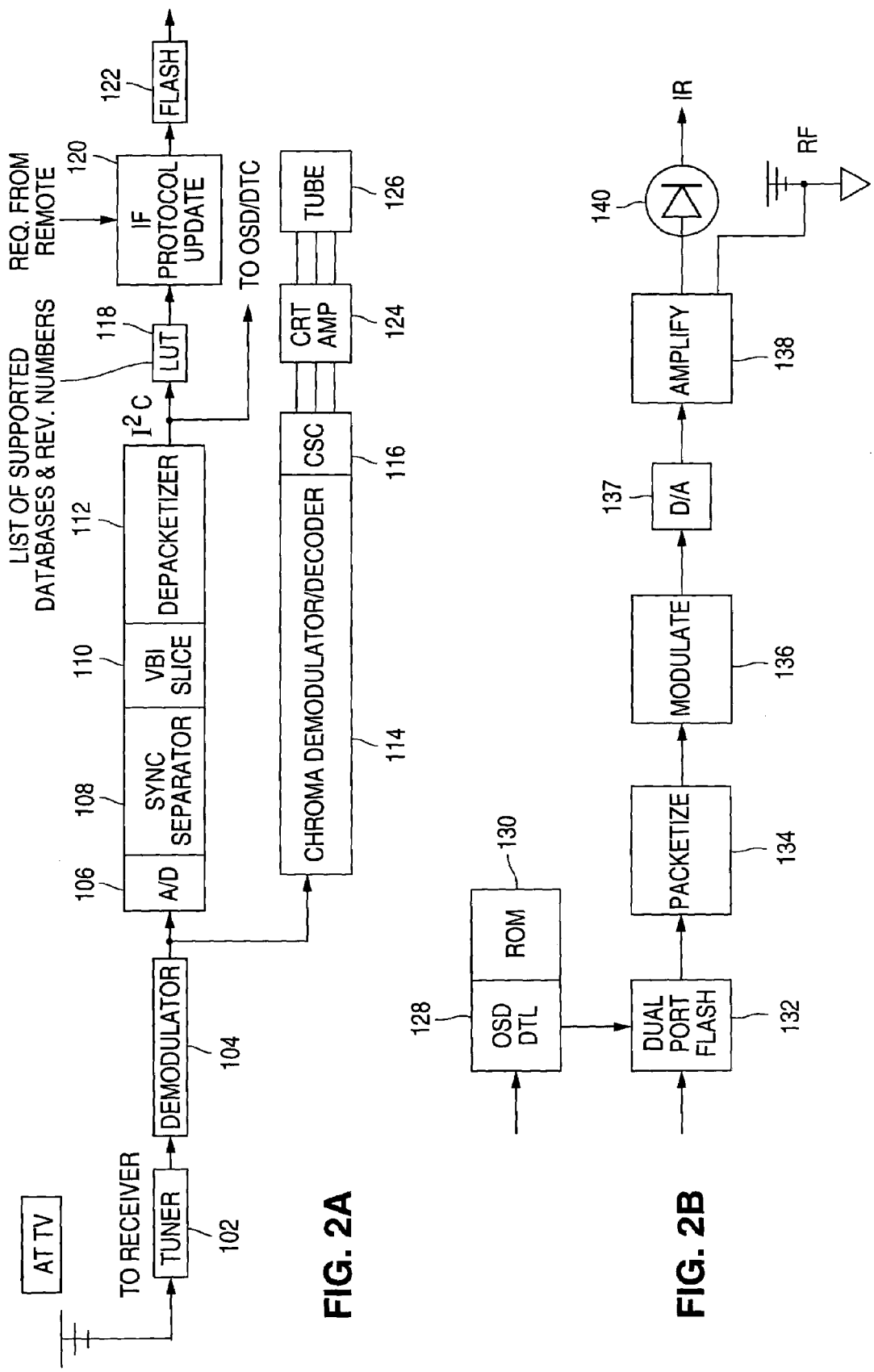

METHOD AND APPARATUS FOR UPDATING UNIVERSAL REMOTE DATABASES THROUGH TV VBI PROCESSING

FIELD OF INVENTION

Invention relates to remote control electronics, and particularly to updating of databases for universal remote control devices.

BACKGROUND OF INVENTION

Various remote control devices are commercially available for remote wireless user operation of different consumer electronics appliances, such as television, stereo equipment, video recorders or players, digital versatile disc players, satellite receivers, and other such products. So-called universal remote control devices are also available which operate with multiple different products (e.g., Sony television, and Panasonic DVD player, etc.) However, such conventional universal remote control devices are relatively complex to operate and configure, typically requiring tedious manual steps to program certain codes which correspond to specific products and models. Accordingly, it would be desirable to provide an improved approach for programming or updating universal remote control devices.

SUMMARY OF INVENTION

Invention resides in apparatus and/or method for updating universal remote control device database through television video blanking interval (TV VBI) or sub-picture data signal, for example, in a compressed digital video coder/encoder. As relayed through TV receiver or other intermediate appliance, one or more remote control database is placed in VBI of video signal of specialized video program. Update data is decoded by VBI slicer or controller, then extracted remote control protocol may be stored in memory, and requested data or desired remote control protocol is transmitted via infra-red (IR) or radio frequency (RF) emitter to learning remote control device, which downloads data to update programming protocol.

BRIEF DESCRIPTION OF DRAWINGS

FIGS. 2A–C are detailed block diagrams of various novel implementations associated with universal remote control device preferably configured for implementing the present invention.

DETAILED DESCRIPTION OF PREFERRED EMBODIMENT

Figure 1A:
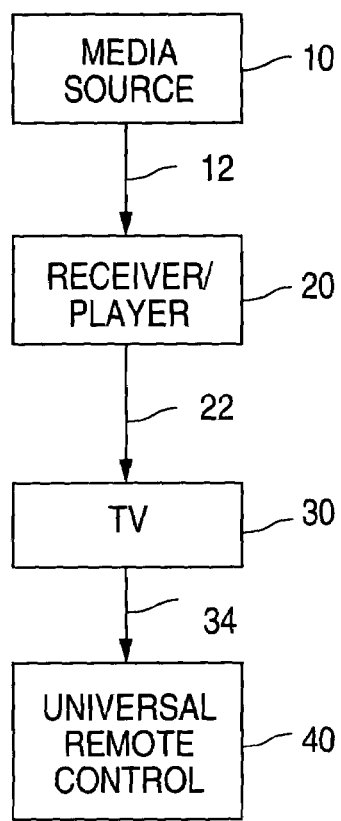
FIG. 1A is a general system block diagram for implementing the present invention.

FIG. 1A is a general block diagram of a representative system for implementing certain novel functional aspects and improvements associated with the present invention, showing media source 10 coupled to receiver or player 20, which also couples to television (TV) 30, which is further coupled to Universal Remote Control (URC) device 40.

As understood herein, media source 10 refers to an electronic source for generating or storing one or more video signal 12 or other related digital or analog data signal. Receiver or player 20 refers to an electronic device, such as a cable set-top box, video tape or disk player, satellite receiver, etc., for receiving, recording, modifying, and/or playing-back the generated or stored video signal 12 to provide therefrom a television video signal 22. TV 30 refers to a video display device, such as conventional or high-definition television, computer system configured with video card, etc., for presenting video and audio components of the television video signal 22. URC device 40 refers to a universal remote controller device which serves remotely to operate the TV 30 in response to user selection as communicated with TV 30 through two-way, wire-less or wired, control signal 34.

Preferred embodiment of present invention is enabled through apparatus and/or method generally which updates universal remote control device protocol or database through television video blanking interval (TV VBI) signal and/or subpicture ancillary data. For example, when relayed through TV receiver or other intermediate video storage, processing or display appliance, one or more remote control database is placed in VBI or sub-picture of video signal of subject video program, i.e., which is specially prepared to encode, embed, modulate, or otherwise include digitally within the VBI signal such data update to the URC database.

Then, update data is decoded, or extracted effectively by VBI slicer, processor, or controller from VBI or sub-picture signal to generate therefrom extracted remote control protocol, and stored in local memory or other digital storage provided in television unit. In response to user request for certain data, operational function, or other selection indication through wire-less signal via radio frequency (RF) or infra-red (IR) signal from URC device, appropriate remote control protocol for requesting URC device is identified. Hence, requested data is transmitted to URC device by television as RF or IR response signal to learning remote control device, which then downloads or stores one or more remote control protocol data to update programming protocol for such URC device.

Preferably, controller, processor, or slicer in receiver/player 30, which decodes the video signal to extract or otherwise obtain the embedded remote control protocol database portion, may identify, recognize, and/or correlate one or more new remote control devices and remote control protocols. Thus, to enable non-volatile configurable operation, one or more particular protocol for remote control unit may be configured in hardware electronics and/or software program or instructions (e.g., software, microcode, reconfigurable logic, etc.).

Figure 1B:
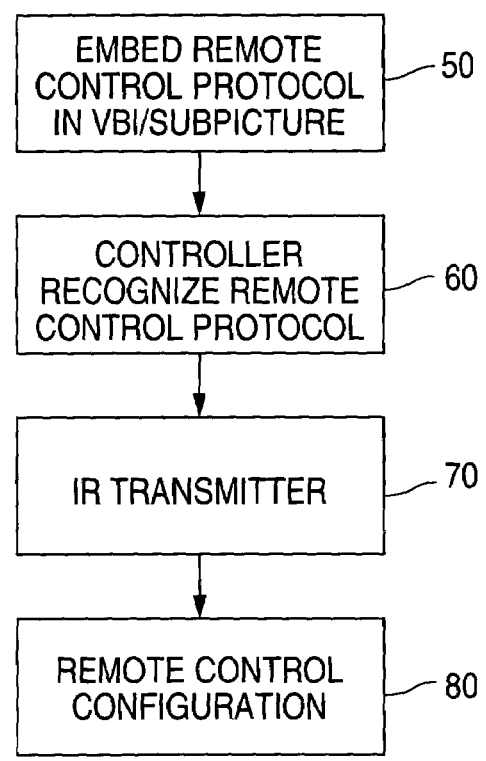
FIG. 1B is a flow chart of operational steps for implementing the present invention.

FIG. 1B flow chart shows operational update steps for electronically modifying or re-configuring one or more universal remote protocol or database, preferably through TV VBI or sub-picture signal processing, as described in further detail herein. Present inventive universal remote control device is updated passively or actively, as communication or programming protocols, software instructions, or other digital instruction code are generated, relayed or passed through television receiver, set-top box, or video player.

In particular, according to one aspect of the present approach, one or more universal remote control databases, or one or more portion thereof, are included, encoded, embedded, modulated, or otherwise provided digitally within or with VBI or sub-picture data of transmitted or received television signal, for example, through specially prepared video signal transmission or storage medium (e.g., pre-recorded video tape, digital versatile disc, or other video broadcast equipment using cable, Internet, satellite, or other delivery and/or storage infrastructure).

Preferably, such provided remote control data serves to program, initialize, operate, configure or otherwise enable one or more remote control device functionality for one or more selected remote control device. Such data, or database assembly thereof, is recognized, removed, extracted, decoded, or otherwise obtained digitally in the television receiver or set-top box coupled thereto for signal processing of the received television signal.

Data signal is generated from television and/or transmitter device, e.g., in the sub-picture content or VBI portion of a digital video signal. Such protocol data is decoded digitally by decoder software and/or hardware (e.g., in case of subpicture content decoding using Moving Picture Experts Group (MPEG)-type decoder), and further processed by a digital processor, microcontroller, or other computing functionality. Then, URC protocol or other device configuration data or instructions is included electronically, for example, as embedded digitally within RF or IR wireless transmission.

After such data extraction digitally from received video signal, extracted data is stored temporarily in one or more data storage devices, or other local memory or digital signal repository. Next, such extracted and/or stored data is transmitted via IR or RF emitter or transmitter to one or more remote control device, which is configured for learning such transmitted protocol data to provide updated configuration selectively for each unique remote device controller.

During operation, preferably upon URC user request or selection, such one or more remote control device downloads update data, which is then appended, overlaid, overwritten, incorporated, or otherwise included into an updated programming protocol, instead of or in addition to any programming protocol already available, stored, or generated locally within given remote control device. Preferably, such updated protocol is imported or assimilated in universal remote capabilities generally.

Advantageously, present method and apparatus serves to update universal remote controls databases through digitally encoded or embedded signal processing, without necessitating manual entry at remote control device. Further, present approach enables update signal channel or path which is generally available or always current (i.e., through television signal or media containing new or live video content,) for example, as may be implemented in one or more consumer video processing devices with updatable programming data (e.g., available commercially from TIVO, Replay Networks, Gemstar, etc.)

In addition, local digital storage usage in remote control electronics is advantageously reduced, since memory space usage for remote control protocols is limited generally to the protocols actually used for particular remote control device (i.e., storage of redundant or unnecessary multiple protocol data is effectively eliminated.) Note that, preferably, database in remote unit may be compressed in the remote control, and a protocol compression layer may be provided in flash storage.

Figure 2C:
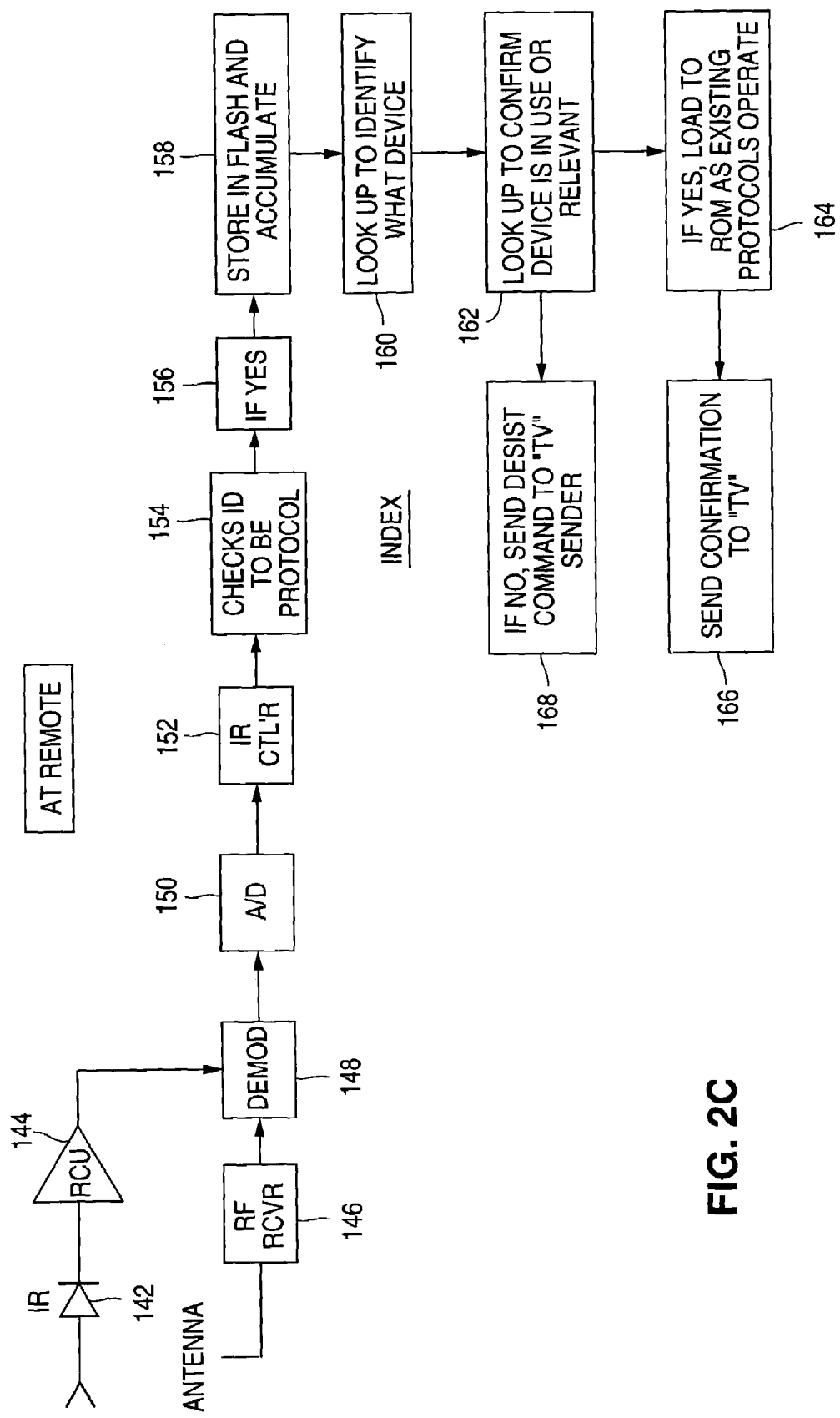

FIGS. 2A–C are detailed block diagrams of various system functions associated with television and universal remote control device, preferably configured for implementing one embodiment of the present invention. At the television side of such system, FIG. 2A diagram shows that television tuner 102 receives analog and/or digital television signal from antenna or other transmission or storage source, which then forwards such received signal for further processing to demodulator 104. Then, demodulated signal is received by analog-to-digital converter 106, which couples to horizontal synch separator 108, VBI slicer 110, and depacketizer 112; also, such demodulated signal may be received by chroma demodulator and decoder 114 as well as color space converter (CSC) processor 116. CSC signal is applied to CRT amplifier 124, which further applies amplified signal to television display or tube 126.

As shown, depacketizer 112 generates I2C signal for look-up table (LUT) 118, wherein list of supported databases and revision or model numbers for particular remote control devices may be stored. I2C signal may be applied to on-screen display/digital television controller (OSD/DTC) module. LUT 118 applies retrieved signal to Infra-Red (IR) protocol update 120 module, which may receive request signal from remote control device, and apply IR protocol update signal to flash memory 122.

Further at the television side of the system, FIG. 2B diagram so-called OSD/DTC module 128 and read only memory (ROM) 130 couples to dual port flash 132, which couples further to packetize module 134, then to modulator 136, digital-to-analog converter 137, amplifier 138, which couples to IR or other RF transmitter 140.

FIG. 2C diagram shows remote control side of the system, including demodulator 148, which receives incoming signal through IR 142 and receiver 144 and/or antenna, RF receiver 146. Demodulated signal is applied to analog-to-digital converter 150, then to IR controller 152.

During operation, IR controller 152 may determine 154 whether received ID signal data is specified protocol. If yes 156, then such confirmed signal data is stored 158 in flash memory and accumulated. Then, IR controller may perform table look-up 160 to determine identity of applicable remote control device, as well as look-up to confirm that present device is actually in use or relevant. Hence, if such determination is made positively by IR controller, then present signal data is loaded 164 to flash memory or RAM as existing protocols operate, and confirmation is sent 166 to television device or wherever protocol is sliced, such as set-top box, receiver, DVD, etc. Otherwise, if present device determined not to be in use or relevant, then desist command is sent 168 to television sender device.

Foregoing described embodiments of the invention are provided as illustrations and descriptions. They are not intended to limit the invention to precise form described. In particular, Applicant contemplates that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by claims following.

What is claimed is:

1. A method of updating data of plurality of signal protocols stored in a memory within a universal remote control adapted to communicate with a video display system and a plurality of other electronic devices, comprising:

receiving within the video display system an update to data of a signal protocol for communicating with an electronic device, wherein the data update is encoded in a video blanking interval of a video signal received by the video display system, in response to a request from the remote control, transmitting the received data update from the video display system to the remote control, and determining, within the remote control, whether the received data are for updating data of a signal protocol stored within the remote control memory for one of the plurality of electronic devices, and, if the received data are for updating data of a signal protocol stored within the remote control memory for one of the plurality of electronic devices, updating or replacing the data for the signal protocol of that one of the plurality of electronic devices, but, if the received data are not for updating data of a signal protocol stored within the remote control memory for one of the plurality of electronic devices, sending a desist command to the video display system.

2. The method of claim 1, additionally comprising, after updating or replacing the data, sending confirmation thereof to the video display system.

3. The method of claim 1, wherein the universal remote control is adapted to communicate through a television receiver as the video display system.

* * * * *